(No Model)

J. E. DAVIS
TIRE TUBE.

No. 591,458. Patented Oct. 12, 1897.

Witnesses:
Walter E. Lombard.
Thomas J. Drummond

Inventor:
Joseph E. Davis,
by Crosby Gregory
Attys.

THE NORRIS PETERS CO., PHOTO-LITHO., WASHINGTON, D. C.

UNITED STATES PATENT OFFICE.

JOSEPH EDWIN DAVIS, OF LYNN, MASSACHUSETTS, ASSIGNOR TO THE BOSTON WOVEN HOSE AND RUBBER COMPANY, OF BOSTON, MASSACHUSETTS.

TIRE-TUBE.

SPECIFICATION forming part of Letters Patent No. 591,458, dated October 12, 1897.

Application filed September 12, 1896. Serial No. 605,582. (No model.)

*To all whom it may concern:*

Be it known that I, JOSEPH EDWIN DAVIS, of Lynn, county of Essex, State of Massachusetts, have invented an Improvement in Tire-Tubes, of which the following description, in connection with the accompanying drawings, is a specification, like letters on the drawings representing like parts.

This invention has for its object the production of a hollow or pneumatic tire which can be rapidly and effectually repaired without the use of plugs, extraneous patches, or tape, and which is cheap and simple in construction. A quick-repair tire has been devised wherein a patching ply or strip of rubber is secured along its longitudinal edge to the interior of the hollow tube, said ply being provided with perforations to permit the passage of air from one to the other side thereof. When the tube is punctured, the part is pressed inward upon the patching-ply after cement has been injected into the interior of the tube through the puncture, and after the cement has hardened sufficiently to connect the ply with the tube, covering the puncture, the tube is inflated. Such inflation, by expanding the tube, draws the ply up toward the tread portion of the tube for some distance at each side of the puncture, and should a second puncture occur near the first the patching-ply will be ruptured and rendered useless. My invention overcomes this objection and at the same time materially decreases the cost of construction of the tube or tire, the patching-ply being entirely unattached to or independent of the tube and normally lying close to the rim side of the tube throughout its extent. Inasmuch as the patching-ply is detached from the air-tube the strain exerted thereupon is greatly reduced when it is drawn to the tread side of the tube to close a puncture.

My invention is equally adapted to a single-tube tire or to a sheathed or double-tube tire, as may be desired, in the latter case the patching-ply being located within the air-tube.

Figure 1:
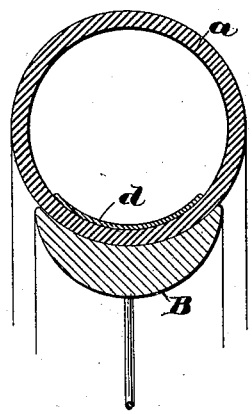
Figure 2:
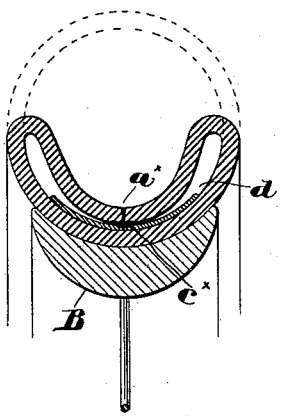
Figure 3:
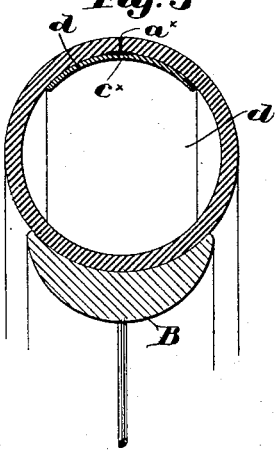
Figure 4:
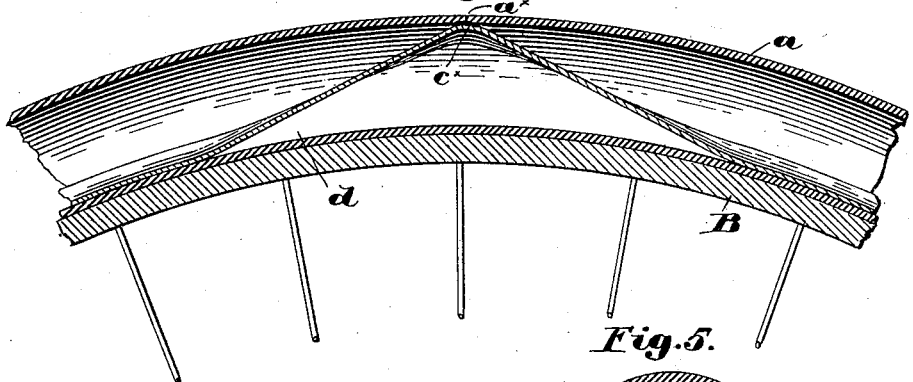
Figure 6:
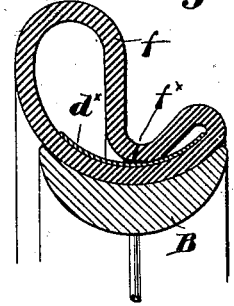
Figure 5:
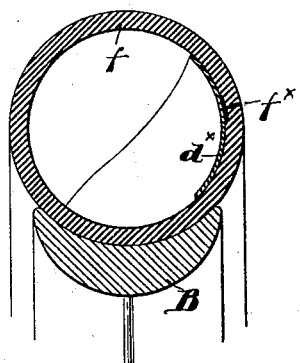

Figure 1, in cross-section, represents a hollow or pneumatic tire of the single-tube class inflated and with the patching-ply in normal position. Fig. 2 is a similar view showing the tube deflated and depressed upon the ply at the point of puncture. Fig. 3, in cross-section, shows the tube as inflated after the application of cement, the patching-ply being drawn up against the tread side of the tube at the puncture. Fig. 4 is a longitudinal section of a portion of the tire on a smaller scale, showing the patching-ply at and adjacent the puncture; and Figs. 5 and 6 show the manner of patching a puncture in the side of the tube.

While I have herein shown my invention as applied to a single-tube tire, it is to be understood that my invention is not restricted thereto, and by the use of the term "hollow or pneumatic tire-tube" I intend to cover such a tube whether it be the air-tube of a double-tube tire or the tire-tube proper of a single-tube tire.

Referring to Fig. 1, the hollow or pneumatic tire-tube $a$ is shown as inflated and mounted in a wheel-rim B, and within the tube I place a continuous patching band or ply $d$, of thin elastic rubber and of such normal diameter that it will be maintained against the rim side of the tube $a$ throughout its extent when not expanded to close a puncture. The width of the band or ply $d$ is such that it would be applicable to a puncture in the main part of the tread side of the tube. Supposing the tube $a$ to be punctured at $a^\times$, Fig. 2, cement is injected into the interior of the tube at the puncture and the tread side of the tube pressed upon the patching-ply $d$, the cement $c^\times$ when dry causing the two to adhere, the ply covering the inner end of and effectually closing the puncture. When the tube is inflated, the ply $d$ will be drawn up adjacent the puncture, as shown in Figs. 3 and 4, along the tread side of the tube, and the air-pressure will hold the ply firmly against the inner end of the puncture. The air in the tube can pass freely from one to the other side of the ply $d$, as the latter is free throughout its extent from the air-tube, and there is no strain upon the ply except the slight longitudinal stretch near the puncture. The remainder of the ply will remain in position against the rim side of the air-tube out of the way of any puncturing article—such as a nail, tack, &c.—so that the tube and patching-ply cannot be punctured simultaneously. Should the ply be punctured by any possibility, however, the part of the air-tube punctured can be pressed down at one or the other side of the puncture in the ply and the cement applied, for when the tube is inflated the ply will slip within the tube and adapt itself to circumstances.

It does not often happen that a tire-tube will be punctured at its side or between the wheel-rim and tread, but it does sometimes occur, and by my invention such a puncture can be repaired as readily as any other.

In Figs. 5 and 6 I show a case of side puncture, and the tube $f$ is pressed upon the ply $d^\times$ at the puncture $f^\times$ and cement applied, and when the tube is inflated the ply will be drawn up at one side of the tire-tube, as shown in Fig. 6, with no undue strain upon it. This adaptability of the patching-ply to close a puncture in any part of the tire-tube is due to the fact that it is detached from the tube throughout its extent, and is therefore perfectly free to adapt itself to all circumstances and conditions. The ply falls away sharply from the puncture-point at each side thereof, and so overcomes the probability of injury should the tire-tube be punctured again near the first puncture.

Having fully described my invention, what I claim, and desire to secure by Letters Patent, is—

1. A hollow or pneumatic tire-tube containing an annular elastic patching-ply normally under tension and thereby held in contact with the rim side of the tube throughout its extent and having free longitudinal edges, substantially as described.

2. A hollow or pneumatic tire-tube containing a narrow continuous, elastic patching-ply normally detached from the tube and in contact throughout its length with the rim side of the tube, substantially as described.

3. A hollow or pneumatic tire-tube containing a single continuous elastic patching-ply normally unsecured to the tube, the said ply being under sufficient longitudinal tension to cause it to normally contact with and hug the rim side of the tube, throughout its length, substantially as described.

In testimony whereof I have signed my name to this specification in the presence of two subscribing witnesses.

JOSEPH EDWIN DAVIS.

Witnesses:
 GEO. W. GREGORY,
 JOHN C. EDWARDS.